US012589548B2

(12) United States Patent
Pokorski et al.

(10) Patent No.: US 12,589,548 B2
(45) Date of Patent: Mar. 31, 2026

(54) PRINTING OF CONDUCTING POLYMERS WITHOUT TOXIC SOLVENTS

(71) Applicant: THE REGENTS OF THE UNIVERSITY OF CALIFORNIA, Oakland, CA (US)

(72) Inventors: Jonathan K. Pokorski, San Diego, CA (US); Yi Zheng, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 110 days.

(21) Appl. No.: 18/832,737

(22) PCT Filed: Jan. 26, 2023

(86) PCT No.: PCT/US2023/061353
§ 371 (c)(1),
(2) Date: Jul. 24, 2024

(87) PCT Pub. No.: WO2023/154627
PCT Pub. Date: Aug. 17, 2023

(65) Prior Publication Data
US 2025/0296277 A1 Sep. 25, 2025

Related U.S. Application Data

(60) Provisional application No. 63/309,210, filed on Feb. 11, 2022.

(51) Int. Cl.
B29C 64/118 (2017.01)
B29C 64/30 (2017.01)
(Continued)

(52) U.S. Cl.
CPC ........... B29C 64/118 (2017.08); B29C 64/30 (2017.08); B29C 71/02 (2013.01); B33Y 10/00 (2014.12);
(Continued)

(58) Field of Classification Search
CPC ....... B29C 64/118; B29C 64/30; B29C 71/02; B29C 64/124; B29C 64/209;
(Continued)

(56) References Cited

U.S. PATENT DOCUMENTS

2013/0203198 A1* 8/2013 Min ........................ H10K 50/30
438/46
2017/0370024 A1* 12/2017 Zhou ...................... D01D 10/02
(Continued)

FOREIGN PATENT DOCUMENTS

JP 2009293155 A * 12/2009
WO WO-2016087945 A2 * 6/2016 ............... D01F 6/94

OTHER PUBLICATIONS

Grocke, et al., "Structure—Transport Properties Governing the Interplay in Humidity-Dependent Mixed Ionic and Electronic Conduction of Conjugated Polyelectrolytes", ACS Polymers, 2022, 2, pp. 275-286.

(Continued)

*Primary Examiner* — Nahida Sultana
(74) *Attorney, Agent, or Firm* — Greer, Burns & Crain, Ltd.; Steven P. Fallon

(57) ABSTRACT

A method for printing of doped conducting polymer includes immersing at least a portion of a surface of a substrate with a coagulation bath. A doped conducting polymer is printed from a nozzle onto the substrate that is within the coagulation bath. The nozzle penetrates below a surface of the coagulation bath at a predetermined distance from the substrate. The doped conducting polymer includes an anionic dopant. The coagulation bath includes a concentration of material that provides a secondary dopant of the doped conducting polymer.

20 Claims, 8 Drawing Sheets

(51) Int. Cl.

| | |
|---|---|
| *B29C 71/02* | (2006.01) |
| *B29K 25/00* | (2006.01) |
| *B29K 105/00* | (2006.01) |
| *B33Y 10/00* | (2015.01) |
| *B33Y 40/10* | (2020.01) |
| *B33Y 40/20* | (2020.01) |
| *C09D 11/102* | (2014.01) |
| *C09D 11/107* | (2014.01) |
| *C09D 11/52* | (2014.01) |

(52) U.S. Cl.
CPC .............. *B33Y 40/10* (2020.01); *B33Y 40/20* (2020.01); *C09D 11/102* (2013.01); *C09D 11/107* (2013.01); *C09D 11/52* (2013.01); *B29K 2025/08* (2013.01); *B29K 2105/0005* (2013.01); *B29K 2995/0005* (2013.01)

(58) Field of Classification Search
CPC ....... B29C 64/393; B33Y 10/00; B33Y 40/10; B33Y 40/20; B33Y 70/00; B33Y 80/00; C09D 11/102; C09D 11/107; C09D 11/52; B29K 2025/08; B29K 2105/0005; B29K 2995/0005
See application file for complete search history.

(56) References Cited

U.S. PATENT DOCUMENTS

| | | |
|---|---|---|
| 2019/0039294 A1 | 2/2019 | Stasiak |
| 2019/0375149 A1 | 12/2019 | Limem et al. |
| 2020/0115228 A1 | 4/2020 | Owens et al. |
| 2020/0140607 A1 | 5/2020 | Yang et al. |
| 2021/0036722 A1* | 2/2021 | Lim .................... H04B 1/0458 |

OTHER PUBLICATIONS

Lu, et al., "Pure PEDOT:PSS hydrogels", Nature Communications, 2019, 10:1043, pp. 1-10.
Teo, et al., "Direct Patterning of Highly Conductive PEDOT:PSS/ Ionic Liquid Hydrogel via Microreactive Inkjet Printing", ACS Appl. Mater. Interfaces, 2019, 11, pp. 37069-37076.
Xu, et al., "Noncovalently Assembled Electroconductive Hydrogel", ACS Appl. Mater. Interfaces, 2018, 10, pp. 14418-14425.
Yuk, et al., "3D printing of conducting polymers", Nature Communications, 2020, 11:1604, pp. 1-8.
Zhang, et al., "Room-temperature Formed Pedot: PSS Hydrogels Enable Injectable, Soft, and Healable Organic Bioelectronics", 2019, Advanced Materials, 2019, 1904752, pp. 1-7.
International Search Report from the corresponding International Patent Application No. PCT/US2023/061353, dated May 18, 2023.

* cited by examiner

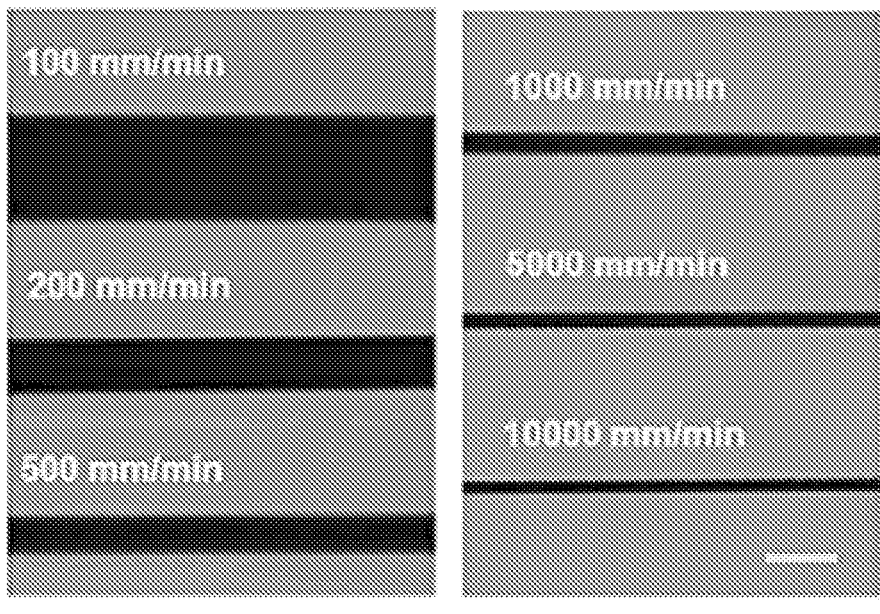
FIG. 2A                    FIG. 2B
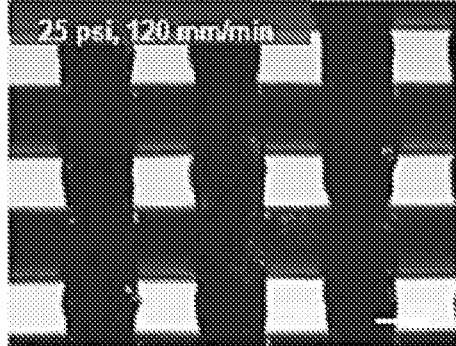          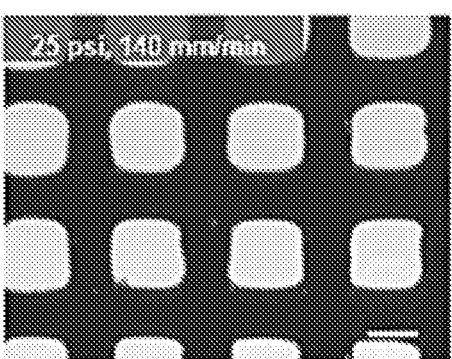
FIG. 2C                    FIG. 2D

PRINTING OF CONDUCTING POLYMERS WITHOUT TOXIC SOLVENTS

PRIORITY CLAIM AND REFERENCE TO RELATED APPLICATION

The application claims priority under 35 U.S.C. § 119 and all applicable statutes and treaties from prior U.S. provisional application Ser. No. 63/309,210, which was filed Feb. 11, 2022.

STATEMENT OF GOVERNMENT INTEREST

This invention was made with government support under DMR-2011924, awarded by the National Science Foundation (NSF). The government has certain rights in this invention.

FIELD

Fields of the invention include printing and conducting polymers. Conducting polymers have many applications, including to biological interfaces and sensors. Common applications include neurological sensing, in vivo electrical signal delivery, thermoelectric harvesters, electrochromic displays, agricultural sensing, and transparent electrodes.

BACKGROUND

Example conducting polymers are polyacetylene, polypyrrole (PPy), polythiophene, poly(3,4-ethylenedioxythiophene) (PEDOT), and polyaniline (PANI). Doping can be used to tune properties of conducting polymers to alter optical, electrochemical and electrical properties, such as doping to increase conductivity. Microstructural differences, including the degree of crystallinity further tune properties of conducting polymers. See, e.g. "Kim, Seong-Min, et al. "Influence of PEDOT:PSS crystallinity and composition on electrochemical transistor performance and long-term stability." Nature communications 9.1 (2018): 1-9."

Poly(3,4-ethylenedioxythiophene) polystyrene sulfonate (PEDOT:PSS) is an example of a doped conducting polymer that has many applications and is valued for its combined high electronic and ionic conductivity, mechanical flexibility, thermal stability, high biocompatibility and commercial availability. Its applications include energy storage, flexible electronics, and bioelectronics.

Conventional manufacturing techniques used to fabricate conducting polymer based electronic devices include ink-jet printing, lithography, electrochemical patterning, aerosol printing, and screen printing. These methods generally have high processing complexity, and often require cleanroom fabrication, which results in high costs. Additionally, the conventional techniques also have resolution limits.

3D printing is lower cost, more versatile, customizable, and requires minimal human intervention during fabrication. 3D printing has been applied to the doped PEDOT:PSS conducting polymer. However, only a few 3D-printable PEDOT:PSS formulations have been reported. These formulations rely on cross-linking biomolecules [Y. Xu et al., "Noncovalently Assembled Electroconductive Hydrogel," ACS Appl. Mater. Interfaces 2018, 10, 14418], anisotropic drop-by-drop patterning [B. Lu et al, "Pure PEDOT:PSS hydrogels," Nature Communications 2019, 10, 1], and microreactive inkjet printing [M. Y. Teo et al., "Direct Patterning of Highly Conductive PEDOT:PSS/Ionic Liquid Hydrogel via Microreactive Inkjet Printing," ACS Appl.

Mater. Interfaces 2019, 11, 37069]. Theses reported methods suffer limitations in resolution, require complex experimental setups and tedious processing procedures, which scarcely differentiate them from conventional manufacturing techniques.

Direct-Ink-Writing (DIW) is an extrusion-based additive manufacturing process. A liquid-phase ink is dispensed out of small nozzles under controlled flow rates and deposited along digitally defined paths to fabricate 3D structures layer-by-layer. Recently a DIW-printable lyophilized PEDOT:PSS ink was developed and used for the fabrication of high-resolution (~30 μm) PEDOT:PSS microstructures. H. Yuk et al., "3D printing of conducting polymers," Nature Communications 2020, 11, 1604. The process required a large amount of PEDOT:PSS solution, and specialized automation was needed to prepare the ink. The as-printed structure had poor substrate adhesion, especially when exposed to moisture. Additionally, the process used a toxic organic solvent (DMSO) to dissolve and disperse the ink, further complicating the printing process.

An injectable hydrogel has been demonstrated by mixing a PEDOT:PSS suspension with 4-dodecylbenzenesulfonic acid (DBSA) at room temperature, a surfactant dopant. The suspension undergoes a liquid-to-gel transition and could be molded into hydrogel fibers. S. Zhang et al., "Room-Temperature-Formed PEDOT:PSS Hydrogels Enable Injectable, Soft, and Healable Organic Bioelectronics," Advanced Materials 2020, 32, 1904752.

SUMMARY OF THE INVENTION

A preferred embodiment provides a method for printing of doped conducting polymer. The method includes immersing at least a portion of a surface of a substrate with a coagulation bath. A doped conducting polymer is printed from a nozzle onto the substrate that is within the coagulation bath. The nozzle penetrates below a surface of the coagulation bath at a predetermined distance from the substrate. The doped conducting polymer includes an anionic dopant. The coagulation bath includes a concentration of material that provides a secondary dopant of the doped conducting polymer.

DETAILED DESCRIPTION OF THE PREFERRED EMBODIMENTS

The invention includes the printing of conducting polymer filaments, electrodes, scaffolds, and 3D structures. Methods of the invention can print conductive polymers in many forms, which have many application including as conductive traces in electrical circuits, to make solid hydrogel 3D parts and to form bioelectronic devices.

A preferred method of the invention prints a doped conducting polymer from a nozzle onto a substrate that has a least a portion of its surface covered with a coagulation bath. The printing is from a nozzle that is positioned into the coagulation bath at a predetermined distance from the substrate. The coagulation bath includes a concentration of material that promotes gelation of the polymer and provides a secondary dopant for the conducting polymer.

Preferred methods were demonstrated experimentally to deposit PEDOT:PSS ink as an aqueous suspension (e.g. a liquid) directly onto a substrate through a coagulation bath. The bath promotes a liquid to gel transition to print solid hydrogel filaments or structures, and the nozzle can be moved and controlled to print 3D parts. The coagulation bath also provides a secondary dopant for the PEDOT, which has the effect of replacing a portion of PSS dopant from PEDOT:PSS, resulting in increased conductivity of the printed structure. DBSA is a preferred material for the coagulation bath and serves to replace any weakly bound PSS dopant at the exterior of filaments thereby promoting gelation. Methods of the invention enable printing of PEDOT:PSS filaments and/or 3D structures for bioelectronic interfaces. The method required no toxic solvents, enhances conductivity, and can provide a long-term stable device in vivo.

A preferred method is a coagulation bath-assisted direct ink writing (DIW) and conducted at or near room temperatures without the use of organic solvents. An example range for at or near room temperature is 18-25° C. A PEDOT:PSS suspension is extruded from a DIW syringe into a coagulation bath, forming a PEDOT:PSS hydrogel in situ. The coagulation bath can be set and adjusted to tune the hydrogel properties via a one-step interpenetrating network (IPN) formation reaction. Post-processing treatment enables PEDOT:PSS to adhere to various substrates, including polyethylene terephthalate, polyimide, and aluminum foil under aqueous conditions.

Preferred embodiments of the invention will now be discussed with respect to experiments and drawings. Broader aspects of the invention will be understood by artisans in view of the general knowledge in the art and the description of the experiments that follows.

Figure 1:
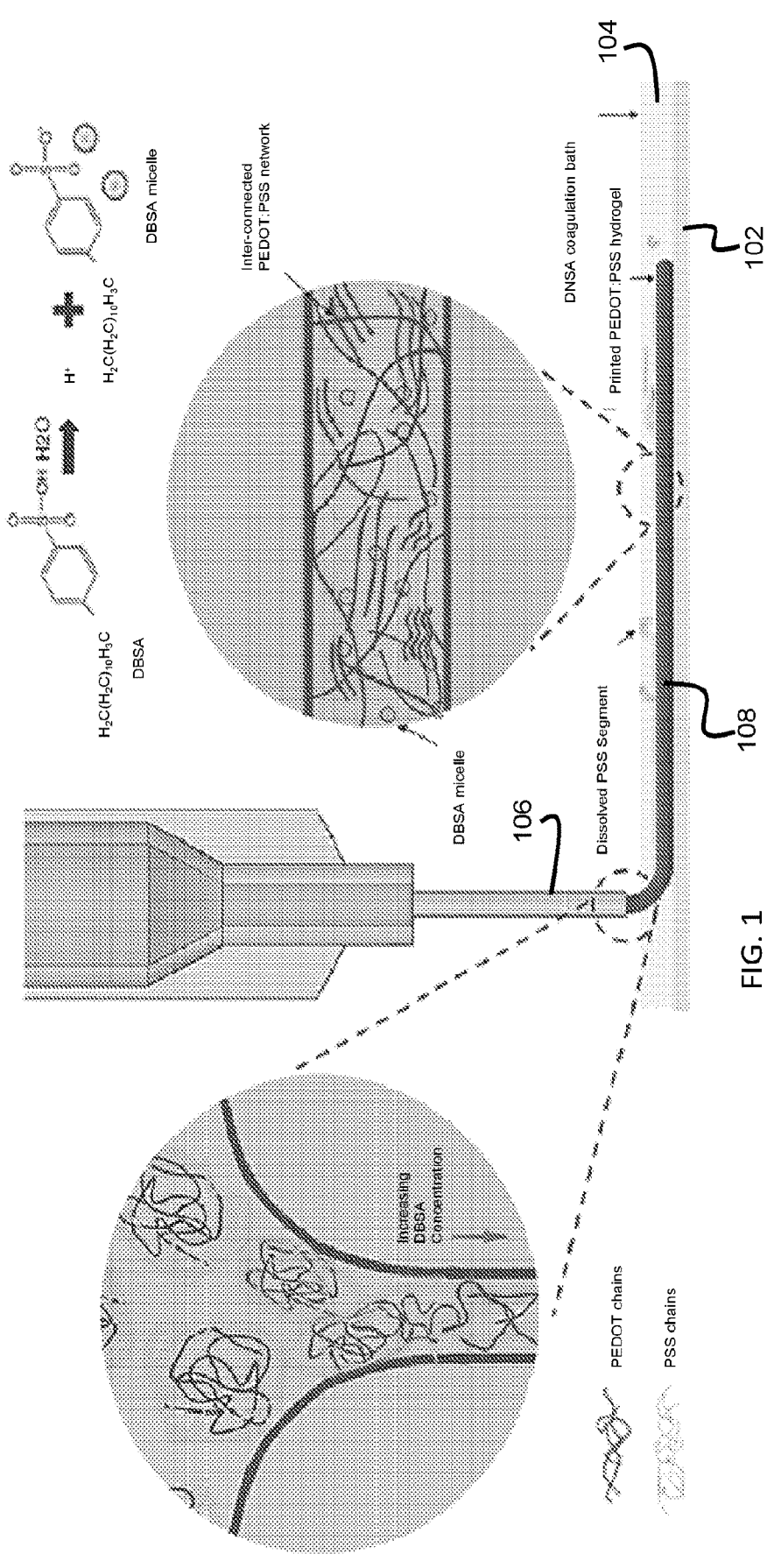
FIG. 1 is a schematic diagram of a preferred method for coagulation-bath assisted DIW for PEDOT:PSS hydrogel patterning and gelation mechanism of a printed PEDOT:PSS hydrogel.

FIG. 1 is a diagram of a preferred method for coagulation-bath assisted DIW for PEDOT:PSS hydrogel patterning and gelation mechanism of a printed PEDOT:PSS hydrogel. In the process, a substrate 102 or a portion thereof to be printed upon is immersed in a coagulation bath 104. A nozzle 106 direct prints a conducting polymer 108 from a suspension onto the substrate 102 that is within the coagulation bath 104. The nozzle 106 penetrates below the surface of the coagulation bath 104. In general, the distance of the nozzle from the substrate 102 determined by the diameter of the inner diameter of nozzle, e.g., a nozzle 106 is set (slightly) less than 100 μm from the surface of the substrate 102 when use a nozzle with 100 μm inner diameter Other factors that control the deposit include nozzle moving speed and applied pressure, as discussed further below and altering, for example, the pressure, can create a wider or narrower filament when the nozzle 106 is 100 μm from the surface of the substrate 102. Higher pressure and/or a slower moving nozzle prints wider filaments, which become narrower with lower pressure and/or the coagulation bath includes a concentration of material that reduces gelation time of the polymer for adhesion onto the substrate 102. Experiments demonstrating the FIG. 1 method will now be discussed with respect to PEDOT:PSS.

Artisans will appreciate that other doped conductive polymers can be deposited via the method of FIG. 1. Example additional doped polymers include polyaniline, polypyrrole, polyacetylene, polycarbazole, polyfluorene, etc. Almost all known conducting polymers require a dopant, and any conducting polymer with an anionic dopant can be used in the invention. An appropriate coagulation bath for each doped polymer can be selected by identifying material that will serve as a secondary dopant for the conducting polymer and permit deposit. In the example of PEDOT, the preferred DBSA replaces PSS that is not tightly bound. The same process will work for any conducting polymer that has a negatively charged dopant. The coagulating agent is essentially a soap that coats the printed filaments and stops them from diffusing into the bath during printing.

Concentrated PEDOT:PSS liquid ink (in a water solvent) was extruded via a DIW nozzle and coagulates immediately into a self-supporting coherent gel when printed through a DBSA coagulation bath. In the experiments, the ink was prepared as follows. PEDOT:PSS (Clevios™ PH1000) was stirred vigorously for 1 hour at room temperature, and roughly 11 g of PEDOT:PSS was charged into a 50 mL round bottomed flask. A rotary evaporator was used to concentrate the PEDOT:PSS suspension in the flask at 50° C. until it became highly viscous. The gel-like mixture was vigorously stirred, via magnetic stir bar, overnight at room temperature. Next, a 10 μm syringe filter was used to filter off large aggregates from the gel, followed twice by a 1 μm syringe filter to yield PEDOT:PSS ink. The ink was characterized using rheology (see below rheological characterization for detailed information) to ensure a solid-to-liquid transition point under applied shear. After filtration, the PEDOT:PSS ink was placed in a falcon tube (50 mL) and degassed by centrifugation at 1200 rpm (2× for 3 min), in order to fully remove the trapped air. The prepared ink was kept at 4° C. prior to use and was brought to room temperature for at least 30 minutes prior to use.

The nozzle was controlled using a 3-axis micropositioning stage, consisting of a z axis on which one 3 cc syringe was loaded with the PEDOT:PSS ink connected to a fluid dispenser (Performus V, EFD Inc, East Providence, RI, USA). For ink extrusion, nozzles (100- and 60-μm nozzles from TaoBao) were attached to the syringe barrels. Prior to printing, the nozzle was briefly immersed in the coagulation bath. All 3D printing processes were performed under ambient conditions with a relative humidity of 20-40% and a temperature of 18-25° C.

The concentration of DBSA in the coagulation bath and concentration of PEDOT:PSS are variables that can be tuned to optimize printing. Water was the solvent for the coagulation bath, which consisted of DBSA and water. Increasing the concentration of DBSA reduces the gelation time of PEDOT:PSS in the coagulation bath. Insufficient DBSA in the bath creates unstable objects which re-suspend. Excessive DBSA results in a highly viscous coagulation bath, which leads to dragging of the printed structures and lowers printing resolution. A concentration of 10 wt % DBSA results in optimally stable prints. At least 1 wt % DBSA permits printing, but prints were not reliably stable at 1 wt % and greater than 1 wt % DBSA is therefore preferred. Printable PEDOT:PSS ink was prepared (typically with a weight concentration higher than 3 wt %). When weight percentage becomes too high, the ink will form aggregates. The weight percentage limit can be determined empirically for individual conducting polymers. The PEDOT:PSS hydrogel was patterned onto a glass slide (via a 100 μm nozzle).

Microscopically, the PEDOT:PSS chains experience a shear-induced alignment during the extrusion caused by a differential shear rate gradient within the printing nozzle's annulus. After the ink was extruded into the coagulation bath, the electrostatic attraction between the aligned PEDOT$^+$ and PSS$^-$ chains is weakened by the high ionic strength of the bath, and the exposed PEDOT$^+$ chains re-arrange with DBSA micelles to form an inter-connected PEDOT:PSS network. This network is likely formed due to physical crosslinking promoted by π-π stacking and hydrophobic attractions. Rheological measurements demonstrated a small decrease in the complex viscosity of the printed hydrogel as the shear rate was increased and a stable modulus of the hydrogel over a range of shear rates, which indicated physical cross-linking. The absence of DBSA molecules in the washed PEDOT:PSS hydrogel, as determined by Fourier-transform infrared spectroscopy (FTIR). suggests a non-covalent bonding of DBSA to the PEDOT: PSS. Conductivity of deposited PEDOT:PSS was confirmed via a simple test in which two AA alkaline batteries (3V) were connected via PEDOT:PSS printed electrodes to a LED (white light, 1206), which illuminated brightly.

Figure 2E:
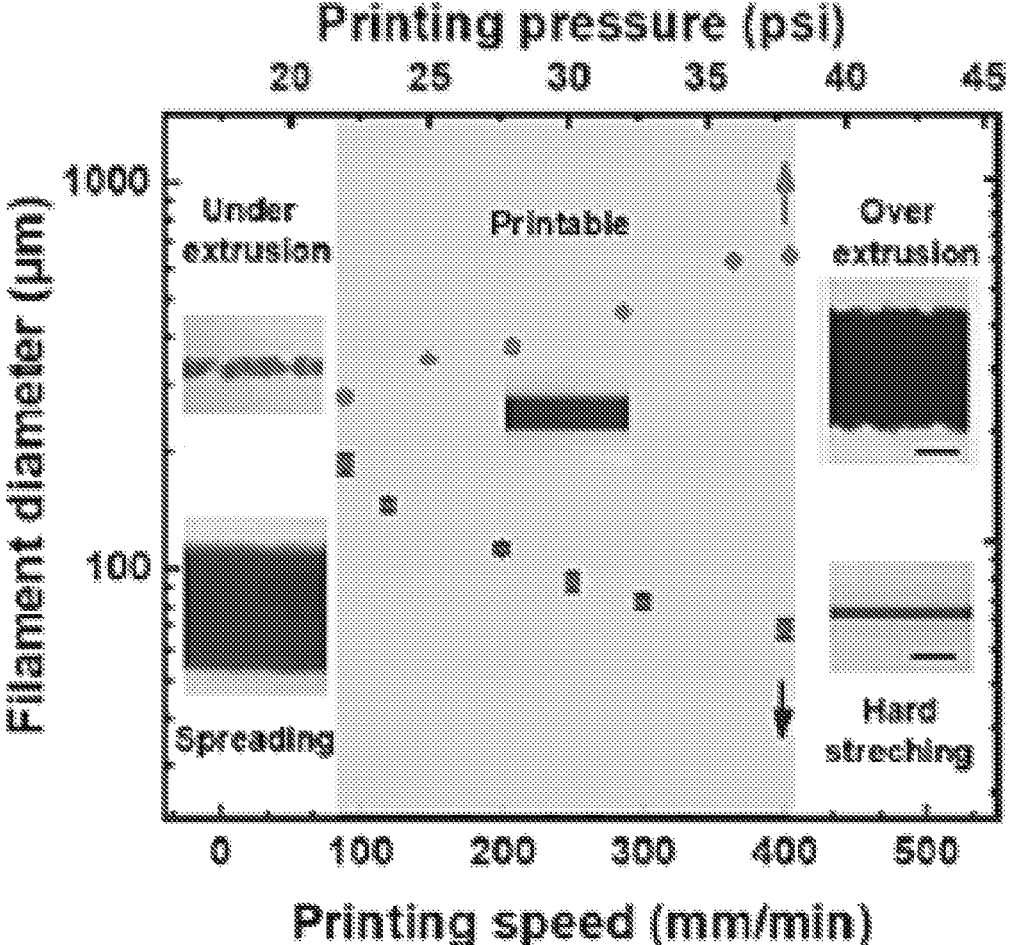
FIG. 2E is a plot of XRD spectra of pure PEDOT:PSS, non-printed and PEDOT:PSS hydrogel printed in accordance with the invention.

Printing speed and nozzle pressure are two main factors which contribute to the properties of the resultant hydrogel filaments. FIGS. 2A and 2B are images of filaments printed at different speed. The piles of FIGS. 2C and 2D were less than the inner diameter of the nozzle, and such piles have an example application to tissue engineering (3D cell cultures). With a fixed nozzle diameter of 100 μm, we tested the influence of printing speed and pressure on the extruded filament diameter. Other diameter nozzles can be used. For example, a 150 μm diameter could be used. The infiltration speed of the secondary dopant (e.g. DBSA) into the extruded conducting polymer (e.g., PEDOT:PSS) can be lower with a larger diameter. Generally, it is preferred to set the lowest diameter that will avoid nozzle clogging, which is a function of the wt % of the conducting polymer in the ink. Lower printing speed (with a constant printing pressure at ~28 psi) and higher printing pressure (with a constant printing speed at ~140 mm/min) resulted in larger filament diameters, and vice versa. In the printable range, smooth and consistent printed filament was achieved. However, when printing speed was too slow (lower than ~90 mm/min, with a constant printing pressure at ~28 psi), "spreading" happened; if the printing speed was set too high (higher than 400 mm/min, with a constant printing pressure at ~28 psi), "hard-stretching" (the phenomenon of a formed PEDOT: PSS hydrogel being stretched by the fast-moving nozzle) occurred. When printing pressure (at the dispenser) was set too low (lower than ~22 psi, with a constant printing speed at ~140 mm/min), "under-extrusion" occurred. Likewise, if the printing pressure was set too high (higher than ~38 psi, with a constant printing speed at ~140 mm/min), "over-extrusion" resulted, as seen in FIG. 2E. Good prints showed smooth, consistent, and shear-induced aligned microstructural features in scanning electron microscopy (SEM) micrographs. Filaments that showed printing deficiencies of spreading and over extrusion shared similar porous and non-aligned structure. For print parameters that resulted in hard-stretching, an aligned coalesced structure was observed in SEM micrographs. The hard-stretching parameters led to ultra-thin PEDOT:PSS fibers (with a diameter less than 10 μm after the prints are washed by DI water and air-dried), while having an anomalously high electrical conductivity of ~530 S cm$^{-1}$, demonstrating highly conductive ultra-thin highly conductive fibers.

Figure 2F:
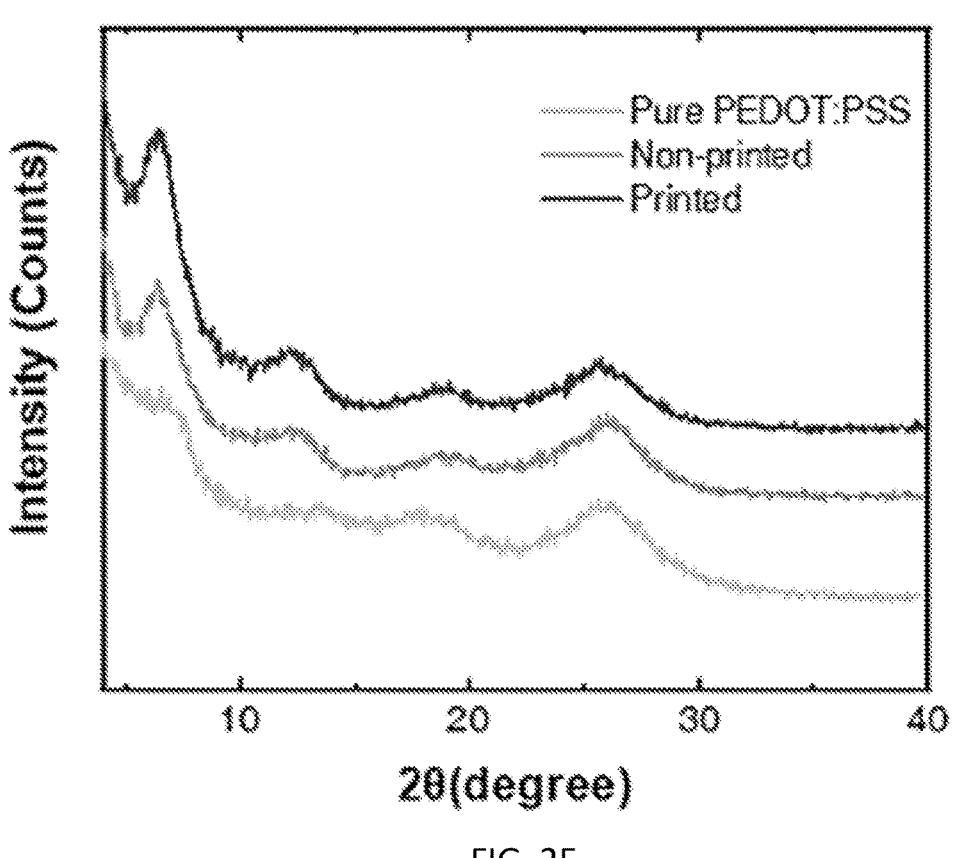
FIG. 2F is a plot of Raman spectra of pure PEDOT:PSS, non-printed and PEDOT:PSS hydrogel printed in accordance with the invention.
Figure 2G:
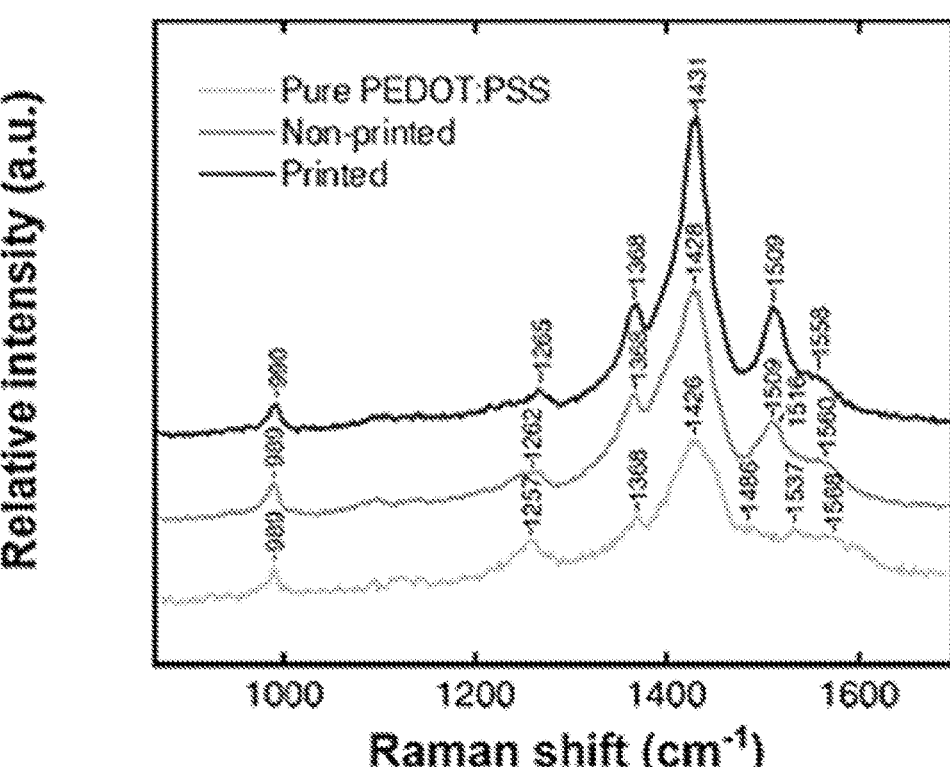
FIGS. 2A and 2B are optical microscopy images (with a scale bar of 100 μm) of PEDOT:PSS hydrogel filaments printed at different printing speeds in accordance with the preferred method of FIG. 1.
FIGS. 2C and 2D are optical microscope images (Scale bar: 150 μm) of PEDOT:PSS woodpile structures formed by the preferred method of FIG. 1 at respective rates of 120 and 140 mm/min.

FIG. 2F and FIG. 2G reveal the favorable qualities of experimental filaments. Specifically, that the experimental method was able to fabricate a printed PEDOT:PSS hydrogel with a high electrical conductivity of up to ~35 S cm$^{-1}$, significantly higher than that of as-produced PEDOT:PSS which only has a conductivity of $10^{-1}$ S cm$^{-1}$. While the theory is not necessary to practice the present methods, we hypothesize that the shear and strain-induced rearrangement of PEDOT:PSS chains in combination with the addition of DBSA as a secondary dopant in the coagulation bath gives rise to the high electrical conductivity in the printed material. Upon printing, the PEDOT:PSS hydrogel immediately adhered to the substrate via hydrogen bonding. As the nozzle moves, it induces a stretching action between the nozzle and the adhered print geometry. We theorize that this stretching action results in strain-induced microstructural rearrangement (increased degree of crystallinity) of PEDOT:PSS chains. In order to evaluate this hypothesis, a printed hydrogel (air-dried), a non-printed hydrogel (air-dried) and a room-temperature-dried PEDOT:PSS film cast from the ink suspension were prepared for characterization. X-Ray Diffraction (XRD) (FIG. 2F) was first used to evaluate the strain-induced rearrangement within the samples. XRD patterns of PEDOT:PSS have three characteristic peaks: 2θ=6.6° (d=13.4 Å), 17.7° (d=5.0 Å), and 25.6° (d=3.5 Å), where the lattice spacing (d) is calculated using Bragg's law. The low angle reflections at 2θ=6.6° corresponds to the lamella stacking distance $d_{(100)}$ of PEDOT and PSS, whereas the two high angle reflections at 2θ=17.7° and 25.6° are indexed to the amorphous halo of PSS and the interchain planar ring-stacking distance of $d_{(010)}$ of PEDOT, respectively, The XRD patterns of the non-printed hydrogel and printed hydrogel have several differences from that of pure PEDOT:PSS, as seen in FIG. 2F: A) After treatment with 10% DBSA, the peak at 6.6° shifts to a lower angle with an increased intensity, also a second-order reflection peaks $d_{(200)}$ at 2θ=13.3° appears, which indicates increased lamella stacking distance and enhanced crystallinity; B) The peaks of the printed hydrogel have an even higher intensity and the peak at 6.6° shifts to an even lower angle compared to the non-printed hydrogel, which indicates the printing procedure further increases lamella stacking distance and crystallinity.

The FIG. 2G Raman spectra were taken using green light excitation with a wavelength of 532 nm. In the Raman spectra of pure PEDOT:PSS, the most intense band at 1426 cm$^{-1}$ is attributed to PEDOT and it corresponds to the Cα=Cβ symmetric stretching vibration of the five-membered thiophene ring originating from neutral parts existing between the localized elementary excitations. The band becomes narrower and blue shifted at 1428 cm$^{-1}$ and 1431 cm$^{-1}$ for the non-printed hydrogel and printed hydrogel, respectively. Peak shifting to higher wavenumbers can be associated with an increase in the sample doping level due to the incorporation of DBSA anions during printing. This effect is related to the degree of backbone deformation during oxidation to polarons and bi-polarons and the associated transitions between quinoid and benzoid structure. A decrease in bandwidth can be seen as additional evidence of further transformation of the PEDOT structure from an irregular coil benzoid structure to a linear or expanded-coil quinoid structure. Another obvious difference between the pure PEDOT:PSS and the DBSA-treated PEDOT:PSS hydrogel is the disappearance of bands at 1486 and 1537 cm$^{-1}$ and the appearance of a new intense band at 1510 cm$^{-1}$, this phenomenon may be caused by rearrangement of the PEDOT. The bands at 1124 and 1098 cm$^{-1}$ correspond to the vibrational modes of the PSS component of pure PEDOT:PSS, while the intensity of these bands is much lower for the DBSA-treated hydrogels, suggesting that a large portion of the remaining PSS-rich regions are removed during the DBSA treatment. We attribute the combined effects of increased doping level, chain expansion, removal of PSS insulating polymers, and resultant morphological change together result in the strongly enhanced conductivity of PEDOT:PSS hydrogel when printed in a DBSA coagulation bath.

Print pressure and print speed result in microstructural changes of printed materials, which is reflected in the electrical conductivity of parts printed in accordance with present methods with different parameters. PEDOT:PSS hydrogels, when printed at ~150 mm/min and ~28 psi, showed a conductivity of ~34 S cm$^{-1}$, which further increased to ~280 S cm$^{-1}$ after drying. When print pressure is increased to ~32 psi, the conductivity decreased to ~22 S cm$^{-1}$ for the hydrogel and ~125 S cm$^{-1}$ upon drying. The macroscopic properties of high-pressure prints suggest "over extrusion", which was correlated to microscopic properties, as described above. When increasing print speed to ~180 mm/min, the material had even lower conductivity at ~18 S cm$^{-1}$ and ~70 S cm$^{-1}$, suggesting both "over extrusion" and "hard stretching" happened during printing. However, when print pressure is at ~36 psi, and print speed as high as ~240 mm/min, the conductivity of the printed material showed increased conductivity at ~22 and ~110 S cm$^{-1}$ before and after drying, respectively. These results suggested print pressure and print speed can be optimized in order to achieve fabrication of highly conductive PEDOT: PSS.

Figure 3A:
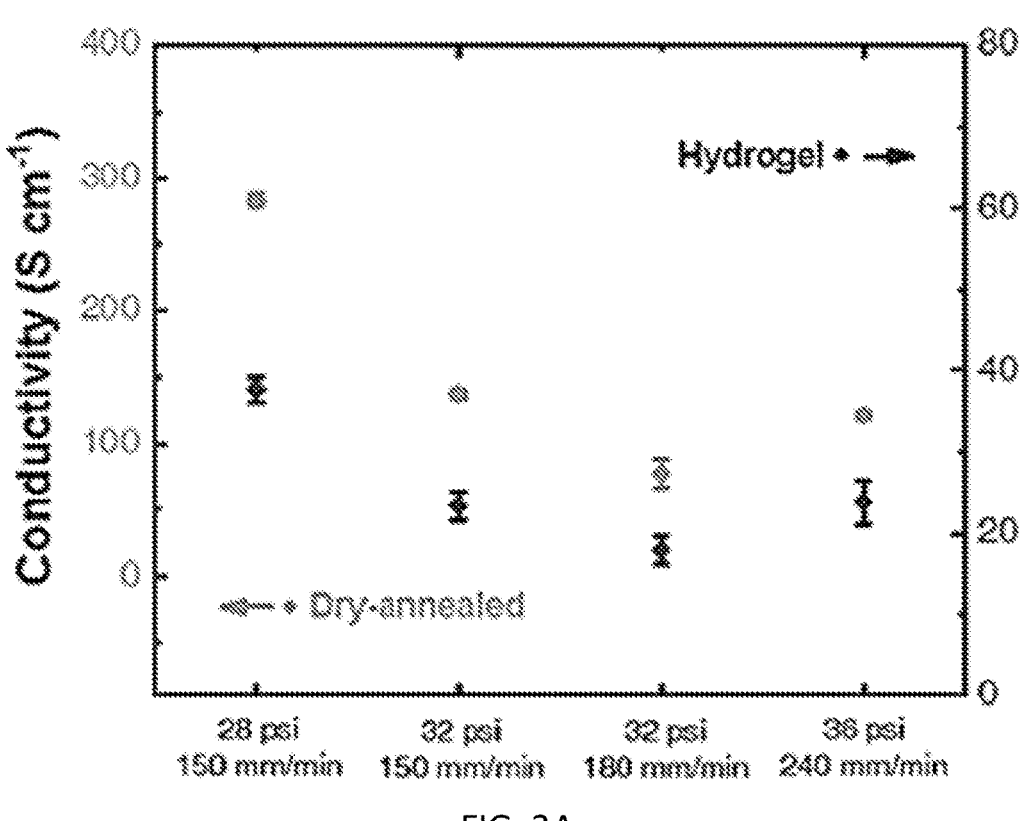
FIGS. 3A-3F illustrate mechanical and electrical properties of PEDOT:PSS hydrogel printed in accordance with the invention.
Figure 3B:
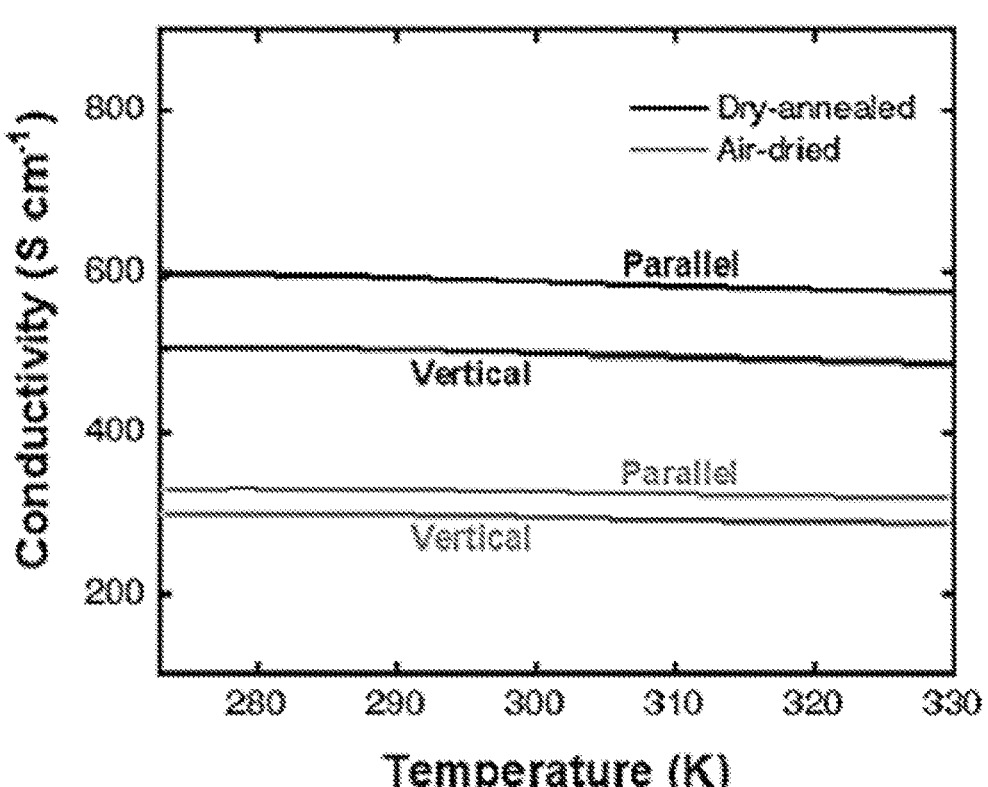
Figure 3C:
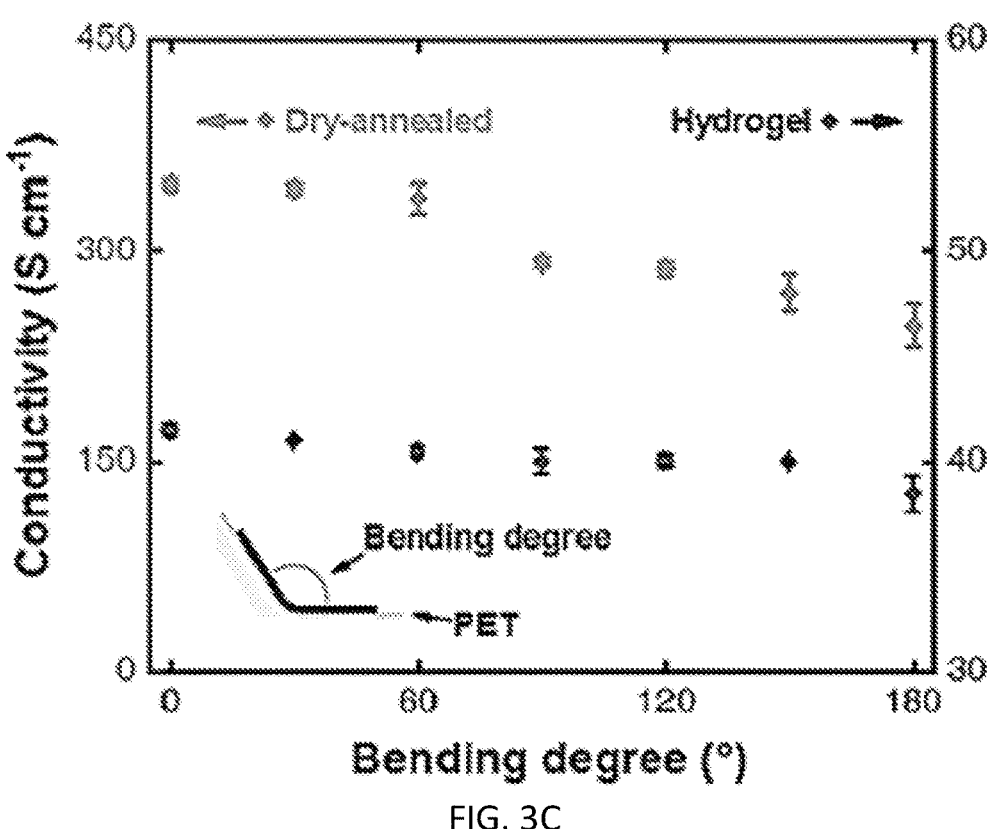
Figure 3D:
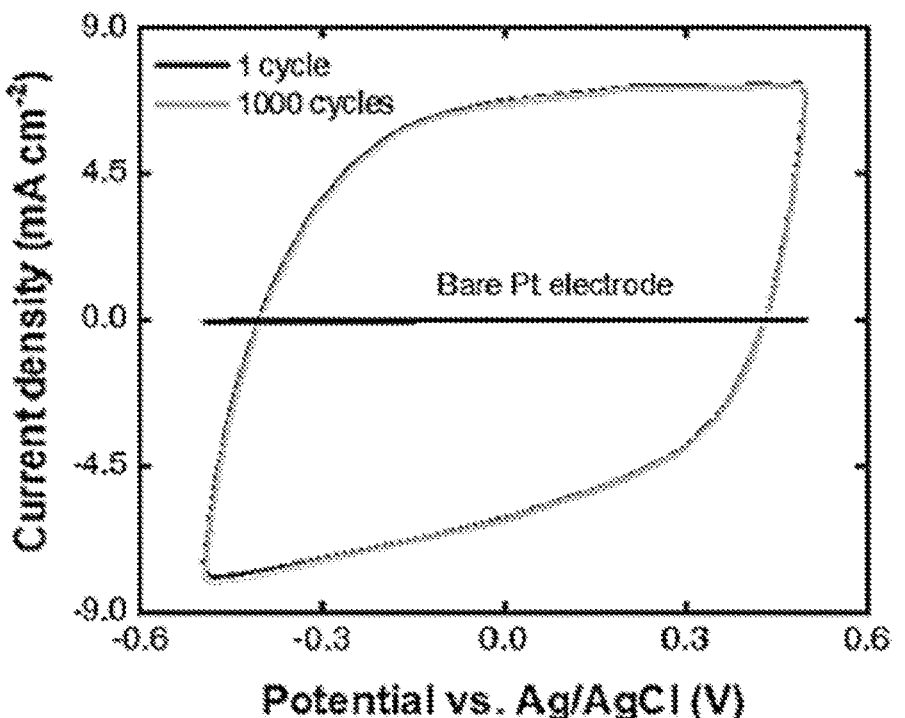
Figure 3E:
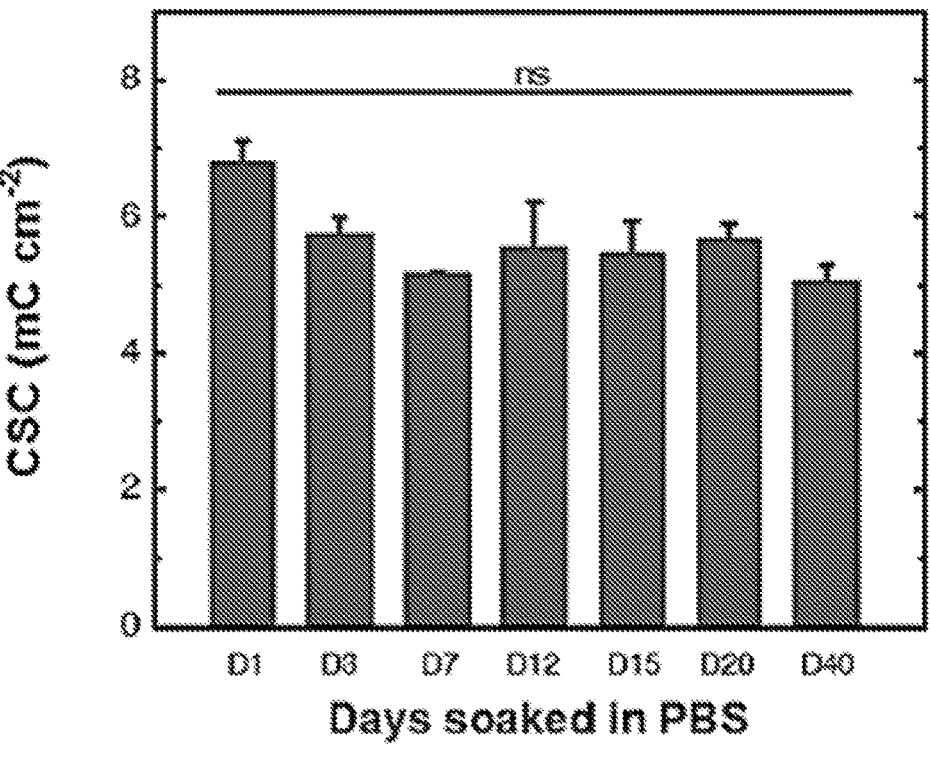
Figure 3F:
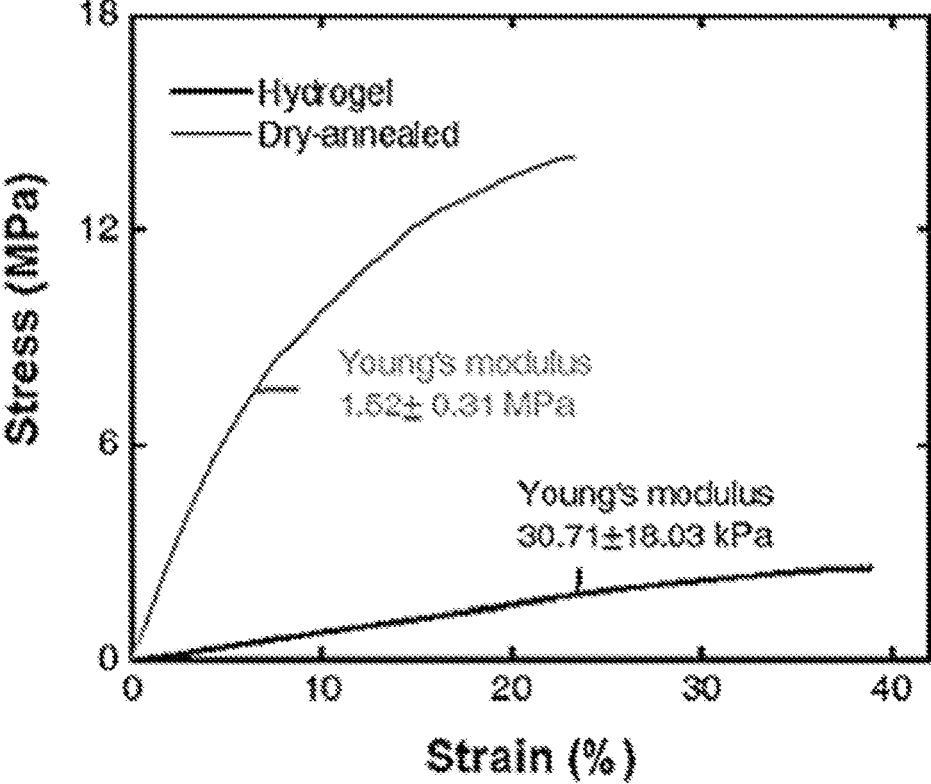

FIG. 3A plots conductivity of the printed PEDOT:PSS printed with various printing parameters for both the hydrogel and dry-annealed material. Error bars indicate SD; n=3 for each group. FIG. 3B shows the relationship between temperature and conductivity of dry printed PEDOT:PSS and dry-annealed printed PEDOT:PSS. FIG. 3C plots conductivity as a function of bend angle for printed PEDOT: PSS hydrogel as well as its dry state. Error bars indicate SD; n=3 for each group. FIG. 3D is a CV characterization for printed PEDOT:PSS on Pt substrate. FIG. 3E is a characterization of the CSC (high charge storage capability) of the printed PEDOT:PSS hydrogel incubated in PBS over 20 days. Error bars indicate SD; n=3 for each group. FIG. 3F shows tensile test results of printed PEDOT:PSS hydrogel and its dry state. NS=not significant.

The microstructure of printed PEDOT:PSS show a quasi-uniaxial arrangement of surface grain when examined under SEM. At the same time, the conductivity of the polymer along the print direction exhibits a 15% increase than in the orthogonal direction (indicated as 'vertical' in FIG. 3B) when in the dry-annealed state and 8% difference when in the air-dried state, suggesting an anisotropic structural arrangement. The stable conductivity of the samples over temperature range from 273K to 330K, shows potential to be applied for bioelectronics (FIG. 3B). Consistent conductivity of the material during flexure is an essential property for biocompatible electronics. Therefore, to investigate the effect of mechanical bending on the electric properties of our printed PEDOT:PSS, we measured the electrical conductivity of a line printed with a 100 μm nozzle from PEDOT:PSS on a flexible polyethylene terephthalate (PET) substrate and plotted this conductivity as a function of the bend angle. The printed PEDOT:PSS sample showed less than 5% change in electrical conductivity across a wide range of bend angles in the hydrated states, while ~25% difference was observed in the dry-annealed state between the highest and lowest conductivities (conductivity increased with decreased bending degree), which might be caused by more tightly packed conductive PEDOT-rich cores (FIG. 3C). To investigate the electrochemical properties of the printed PEDOT:PSS hydrogel and its long-term stability in physiological conditions, we performed cyclic voltammetry (CV) of the saturated hydrogel in a phosphate-buffered saline (PBS) solution. The CV response demonstrates a high charge storage capability (CSC) of the printed PEDOT:PSS hydrogel (100-μm nozzle, 1 layer on Pt clamp) when compared to a typical metallic electrode material, such as Pt, with exceptional stability (less than 2% reduction in CSC after 1000 cycles) (FIG. 3D). The printed PEDOT:PSS maintained its high CSC value (with less than 5% change) even after 40 days of incubation (FIG. 3E). The CV of the printed PEDOT:PSS further shows broad and stable anodic and cathodic peaks under varying potential scan rates, suggesting non-diffusional redox processes and electrochemical stability of the printed PEDOT:PSS.

Additional tests were conducted to characterize the mechanical properties of the PEDOT:PSS hydrogel to evaluate its potential to match the modulus of biological tissue, and to assess its mechanical durability. The mechanical properties of the printed PEDOT:PSS were investigated through tensile testing of a rectangular shaped sample (single layer, 100 μm printing nozzle, 30×5 mm). We found that the printed PEDOT:PSS displayed a Young's modulus of 1.52±0.31 MPa in the dry-annealed state, and of 30.71±18.03 kPa in the hydrated state. (FIG. 3F) The superior softness and high conductivity of the printed PEDOT:PSS suggests favorable long-term biomechanical interactions with tissue, which has tremendous potential in bioelectronics devices and implants, especially in neuromodulation therapies.

Figure 4:
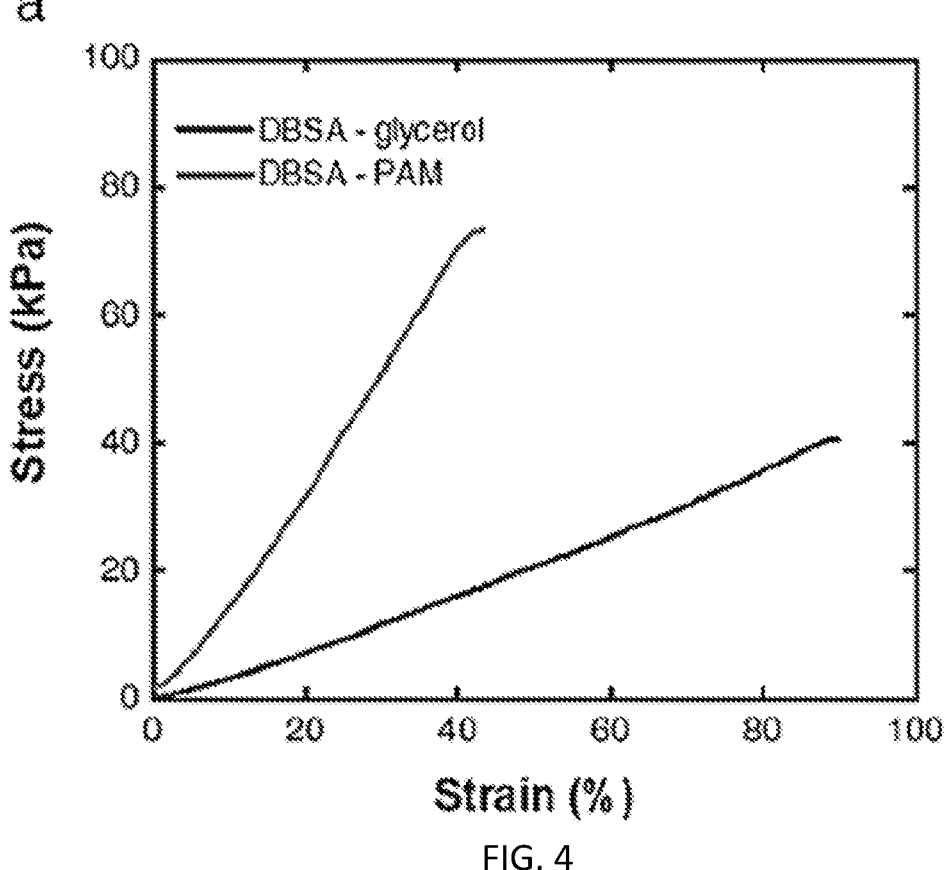
FIG. 4 shows mechanical properties of PEDOT:PSS hydrogel printed into solvent additive treated coagulation bath and infiltrated w/secondary PAAm.

The coagulation bath offers the possibility to control the composition of the resulting PEDOT:PSS parts by altering the composition of the bath. For example, one opportunity is the formation of IPNs to improve upon the mechanical properties of the gels. Infiltration with precursors of a secondary hydrogel is a common method to modify the mechanical properties of preformed PEDOT:PSS hydrogels. In the present method, instead of infiltrating the preformed first network with a second network of monomers/precursors, the coagulation bath allows for a one-step formation of IPNs by adding the precursors of a secondary hydrogel into the coagulation bath along with DBSA. We selected polyacrylamide (PAAm) as the secondary network to enhance the Young's modulus of the PEDOT:PSS hydrogel and we suspected it would not impact the electrochemical properties. To synthesize the IPN, acrylamide, a cross-linker (N,N'-methylenebisacrylamide (MBAA)), and a thermal radical polymerization initiator (2,2'-azobis(2-methylpropionamidine) dihydrochloride (VA-044)), were added into the coagulation bath along with DBSA. The IPN was cured via radical polymerization at 50° C. for three hours, after which we observed an almost six-fold increase in Young's modulus, with no substantial change in conductivity, as seen FIG. 4 and the data below. For the secondary network, other acceptable monomers include any water-soluble acrylate, methacrylate, acrylamide, or methacrylamide. With DBSA as the material in the coagulation bath, the monomer selected should be hydrophilic and should be able to be polymerized in DBSA.

| Coagulation Bath | Young's Modulus (kPa) | Elongation (%) | Conductivity (S/cm) |
|---|---|---|---|
| DBSA -Glycerol | 38.54 ± 6.84 | 89.6 ± 2.00 | 2.01 ± 1.15 |
| DBSA - Acrylamide | 171 ± 14.56 | 38.69 ± 6.88 | 21.56 ± 0.54 |

Adjustment of the coagulation bath with solvent or solvent-thermal post treatment can adjust the conductivity of PEDOT:PSS and also the thermoelectric properties and mechanical stretchability. An experiment that added 20 wt % glycerol to the coagulation bath, resulted in PEDOT:PSS hydrogel samples with nearly 300% higher elongation than the unmodified samples, with little difference in conductivity. 15-25 wt % glycerol is expected to provide stable PEDOT:PSS hydrogel samples with similar elongation.

Substrate adhesion was good but can be further improved with treatments that reduce the amount of hydrogen bonding between the PSS dopant and water, and by increasing the amount of hydrogen bonding between PSS and the substrate. Polyethylene terephthalate (PET) substrates were used for the adhesion improvement testing.

The hydrophilic sulfonate group of PSS can hydrogen-bond with the oxygen in PET. The presence of water can inhibit this bonding, however. To promote the desired hydrogen bonding, two problems must be solved: 1) increasing the amount of hydrogen bonding between the prints and substrate, and 2) removing excess DBSA from the prints without causing them to release from the substrate. A preferred solution includes oxygen plasma treatment to clean and activate the substrate, increasing its hydrophilicity and assisting in the formation of hydrogen bonds between the prints and substrate. To remove the DBSA, prints were tilted slightly and allowed to drain for at least half an hour. After this procedure, anhydrous ethanol was gently added dropwise onto the prints to wash away remaining water molecules and dissolve any remaining DBSA, without causing loss of adhesion. The prints were then placed on a hot plate for two minutes at 40° C. to evaporate the ethanol. This gentle evaporation of ethanol guides the formation of hydrogen bonds between PET and PSS, resulting in the enhancement of adhesion of the prints on the substrate. The ethanol treatment is preferably repeated at least three times to fully remove the DBSA and ensure complete hydrogen bonding between PEDOT:PSS and the substrate. This process can also be applied to polyimide (PI) films, another type of insulating film widely used in the electronics industry and aluminum foil, which cam be used for radiation and electromagnetic shielding. To test the adhesive ability, we soaked the printed sample in deionized water overnight and found that the prints have stable adhesion to these substrates. To demonstrate hydrogen bonding is the main force to adhere PEDOT:PSS on these substrates, we introduced urea to disrupt hydrogen bonds. After soaking in 8M urea solution for one hour, the prints fell off from PI, though not from PET nor aluminum foil. The prints fell off from PET when the urea concentration was increased to 13.6 M, however, only a portion of the prints fell from the aluminum foil at a urea concentration at 20 M under vigorous agitation, showing a strong hydrogen bonding strength.

In adhesion enhancement experiments, the substrate (PET, PI and aluminum foil) was first placed in a plasma cleaner (PCE-6, MTI Corporation) for 3 minutes at high power (RF power at 30 W) to clean and activate the substrate. After printing on the activated substrate, the prints were slightly tilted to drain at room temperature for at least half an hour, then gently immersed in ethanol (Anhydrous, ≥99.7%) and the solution was discarded. The print is then placed on a hot plate for 2 minutes at 40° C. The ethanol treatment and heating were repeated twice.

The coagulation bath was modified as followed for the one-step IPN formation: 0.0243 mol, 1.727 g acrylamide (Sigma Aldrich, CAS Number 79-06-1), 0.00012 mol, 0.0388 g 2,2'-azobis(2-methylpropionamidine) dihydrochloride (VA-044) (J&K, CAS Number 27776-21-2) and 0.000016 mol, 0.0025 g N,N'-Methylenebisacrylamide (MBAA) (damas-beta, CAS Number 110-26-9) were dissolved in 10 mL 10% DBSA. After printing, the prints were incubated in the coagulation bath for 15 min, then a pipette was used to remove excess coagulation bath. The printed part was heated to 50° C. for 3 hours to activate radical polymerization. Following polymerization, the hydrogel was washed with deionized water to remove DBSA and small molecules. The coagulation bath was modified as follows for the solvent additive treated hydrogel: 10 wt % of DBSA and 20 wt % of glycerol (Sigma Aldrich, CAS Number 56-81-5) were dissolved in deionized water using a stirring bar at room temperature. After printing, the prints were incubated in the coagulation bath for 15 min, then a pipette was used to remove excess coagulation bath, followed by washing with distilled water (3×).

A post-processing experiment was conducted as follows. 1) Hydrogel preparation: The printed PEDOT:PSS together with the substrate was placed into a petri dish filled with deionized water. The water was discarded and refilled at least three times to remove DBSA to form PEDOT:PSS hydrogels. 2) Air-dried or Heat-annealed PEDOT:PSS: An absorbent tissue (Kimwipe) was used to remove as much remaining water from the hydrogel as possible. For the air-dried structure preparation, the PEDOT:PSS hydrogel was placed in a chemical fume hood overnight to evaporate remaining water. For heat-annealed structure preparation, The PEDOT:PSS hydrogel was placed onto a hot plate, and heated at 40° C. for 30 minutes to remove residual water, followed by 30 minutes dry-annealing at 130° C.

Stability of the printed conductive traces was also demonstrate with in vivo testing of a micro-Electrocorticography (μECoG) type cortex-wide neural interface (the entire processing time of conducting electrodes required less than 20 min) allowing intracranial electrical stimulation and simultaneous calcium imaging of brain activity in mice. The μECoG electrodes are placed epidurally on the surface of the brain and offer a high signal-to-noise ratio (SNR) as well as a localized cortical signal without complications such as infection, biological rejection, and signal instability. After three-weeks post-implantation, the impedance between the leftmost and rightmost electrodes is 14.9±0.54 kΩ in vivo, and the electrodes on the cortex are still intact three-months post-implantation. This showed that the electrode array experienced minimal degradation in the physiological environment and demonstrated long-term stability at the neural interface.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for printing of doped conducting polymer, the method comprising:

immersing at least a portion of a surface of a substrate with a coagulation bath;

printing a doped conducting polymer from a nozzle onto the substrate that is within the coagulation bath, wherein the nozzle penetrates below a surface of the coagulation bath at a predetermined distance from the substrate, wherein the doped conducting polymer includes an anionic dopant, and wherein the coagulation bath includes a concentration of material that provides a secondary dopant of the doped conducting polymer.

2. The method of claim 1, wherein the printing is conducted at or near room temperature.

3. The method of claim 2, wherein the printing is conducted in a range of 18° C. to 25° C.

4. The method of claim 1, wherein the coagulation bath comprises a secondary hydrogel to induce an interpenetrating network (IPN) formation reaction.

5. The method of claim 4, wherein the secondary hydrogel is a water-soluble acrylate, methacrylate, acrylamide, or methacrylamide.

6. The method of claim 1, wherein the predetermined distance is set with reference to nozzle diameter, ink pressure and desired thickness.

7. The method of claim 1, wherein the nozzle comprises a direct ink writing nozzle.

8. The method of claim 1, wherein the substrate is one of glass, polyethylene terephthalate, polyimide, and aluminum foil.

9. The method of claim 1, comprising preparing an ink of the doped conducting polymer by concentrating a suspension of the doped conducting polymer.

10. The method of claim 1, wherein the printing comprises setting an ink pressure and nozzle movement pattern to create a conductive filament pattern.

11. The method of claim 9, comprising setting the ink pressure and nozzle movement pattern to create shear-induced aligned microstructural features.

12. The method of claim 9, comprising setting the ink pressure and nozzle movement pattern to create an aligned coalesced structure.

13. The method of claim 1, comprising pretreatment and/or posttreatment of the substrate to enhance substrate adhesion of the doped conducting polymer to the substrate by hydrogen bonding.

14. The method of claim 13, wherein the pretreatment comprises oxygen plasma treatment.

15. The method of claim 1, wherein the posttreatment comprises removing excess coagulation bath material via ethanol evaporation.

16. The method of claim 15, comprising conducing the ethanol evaporation multiple times.

17. The method of claim 1, wherein the doped conducting polymer is PEDOT:PSS and the concentration material that provides a secondary dopant of the doped conducting polymer is 4-dodecylbenzenesulfonic acid (DBSA).

18. The method of claim 16, wherein a concentration of DBSA in the coagulation bath is between 1~10 wt %.

19. The method of claim 1, wherein the doped conducting polymer is selected from one of polyaniline, polypyrrole, polyacetylene, polycarbazole, and polyfluorene.

20. The method of claim 1, wherein the doped conducting polymer is hydrophilic and able to be polymerized in the coagulation bath.

* * * * *